Jan. 6, 1925.

B. W. ST. CLAIR 1,522,211

MEASURING INSTRUMENT

Filed May 19, 1924

Inventor:
Byron W. St Clair,
by *Alexander S. ____*
His Attorney.

Patented Jan. 6, 1925.

1,522,211

UNITED STATES PATENT OFFICE.

BYRON W. ST. CLAIR, OF LYNN, MASSACHUSETTS, ASSIGNOR TO GENERAL ELECTRIC COMPANY, A CORPORATION OF NEW YORK.

MEASURING INSTRUMENT.

Application filed May 19, 1924. Serial No. 714,241.

*To all whom it may concern:*

Be it known that I, BYRON W. ST. CLAIR, a citizen of the United States, residing at Lynn, in the county of Essex, State of Massachusetts, have invented certain new and useful Improvements in Measuring Instruments, of which the following is a specification.

My invention relates to the mechanical construction of measuring instruments and meters and in particular to such parts as the shafts and indicating pointers thereof.

The objects of my invention are to provide a construction for the shafts and pointers of such instruments which is light in weight, yet strong and rigid and remarkably free from vibration.

In carrying my invention into effect, I make these parts of a thin seamless tube of a strong light material such as aluminum, the tube being provided on its exterior surface with a plurality of integral beads or webs parallel to the tube. The webs are preferably formed by drawing the tube through a plurality of dies and gradually working a portion of the material of the tube into the webs. This makes a very light and extremely strong and rigid construction and a construction which is not appreciably susceptible to the resonant vibrations such as are oftentimes present in alternating current electric measuring instruments.

Figure 1:
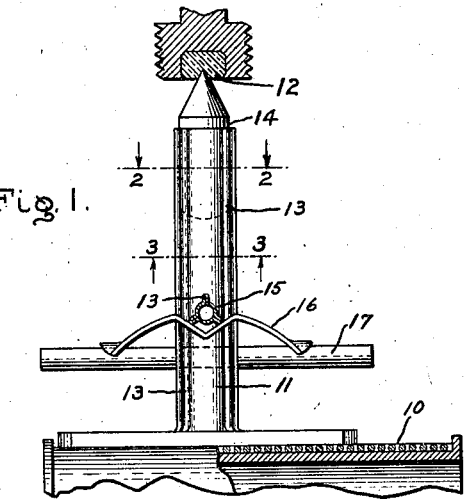
Figure 2:
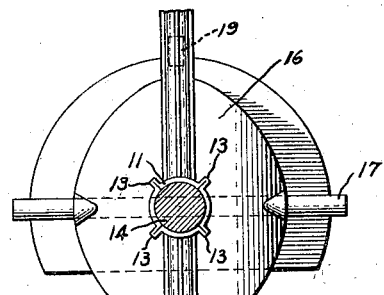
Figure 3:
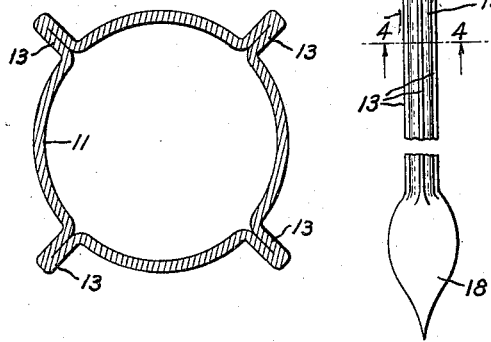
Figure 4:
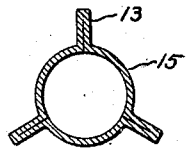

The features of my invention which I believe to be novel and patentable will be pointed out in the claims appended hereto. For a better understanding of my invention, reference is made in the following description to the accompanying drawing in which Fig. 1 shows parts of an electric measuring instrument provided with a shaft and a pointer made in accordance with my invention; Fig. 2 represents a plan view of certain of the parts shown in Fig. 1 taken on line 2—2 of Fig. 1; Fig. 3 represents an enlarged cross section of the instrument shaft taken on line 3—3 of Fig. 1; and Fig. 4 represents an enlarged cross section of the instrument pointer taken on line 4—4 of Fig. 2.

In Fig. 1, 10 represents the moving coil of an electric measuring instrument. This part is provided with a shaft member 11 suitably secured to the coil and extending to the upper bearing 12. The lower portion of the coil and the downward extending portion of the shaft is not shown since it is not essential for the proper illustration of the invention. The shaft 11 is made of a thin, seamless tube of a strong light metal such as aluminum and provided in this instance with four equally spaced webs 13. I have found that the webs may be formed by drawing an aluminum tube through a plurality of split spring collets or dies and gradually reducing the size of the tube and working a portion of the soft material into the webs by a drawing process. A cross section of the shaft thus formed is shown in Fig. 3. The bearing pivots may be snugly fitted into and secured in the ends of the tube as represented at 14 in Fig. 1.

In securing the pointer to the shaft, I prefer to use the fastening means described in United States Patent 1,467,972 to Beckert, September 11, 1923, although any other method of fastening may be used. This fastening means comprises a resilient saucer-shaped member 16 threaded on the shaft and having grooves on its upper and lower surfaces to receive the pointer 15 and a balancing rod 17 respectively. The pointer 15 and rod 17 pass through the shaft 11 at right angles to each other and are held in any desired adjusted position by reason of the saucer-shaped member 16 being slightly compressed between them. It will be noted from Figs. 1 and 2 that in passing the pointer 15 and the rod 17 through the shaft 11, no part of the web members 13 are cut away, but that the pointer 15 and rod 17 pass through openings cut through the cylindrical part of the shaft only between the webs. Consequently, the rigidity and strength of the shaft is not destroyed by such openings.

In alternating current measuring instruments there is a tendency for the pointer to be set into vibrations which are resonant with the fundamental, or some harmonic of the fundamental, frequency. The use of the aluminum tubing with ribs drawn into it for the instrument pointer is substantially non-resonant. The tubing is very rigid and at the same time it is of very light weight and while, theoretically, resonant points will be possible, these points with this construction can be made to occur outside of the vibration periods liable to be set up by commercial frequencies.

The pointer is preferably arranged with three equally spaced webs and one web is preferably placed vertically as shown in Fig. 2. This not only gives the pointer a symmetrical appearance, but the web prevents the pointer from being bent or vibrated in a vertical direction. The other two webs prevent lateral vibrations. The tip of the pointer is preferably flattened and pointed, as indicated at 18. To balance the pointer, a small weight such as is indicated at 19 may be snugly fiitted into the rear end of the tube and adjusted until the proper balance is reached.

This construction materially reduces the weight of the moving coil system and consequently the friction and wear on the bearings and pivot points is likewise reduced. The construction will also withstand severe mechanical usage. The three-web tube might also be used for the shaft but the four-web tube is preferable for that purpose because it is then easier to secure the pointer and other parts to the shaft without destroying its rigidity and strength.

In accordance with the provisions of the patent statutes, I have described the principle of operation of my invention together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. In an electrical measuring instrument, a shaft and a pointer moved by said shaft, each comprising a thin metallic tube having a plurality of integral webs formed thereon parallel with the tube.

2. In an electrical measuring instrument, a shaft and a pointer moved by said shaft, each comprising a seamless drawn aluminum tube provided with equally spaced integral webs formed parallel with the tube.

3. A shaft for an electrical measuring instrument comprising an aluminum tube provided with four equally spaced integral webs running parallel with the tube.

4. A pointer for an electrical measuring instrument comprising a thin metallic tube provided with three equally spaced integral webs running parallel with the tube.

5. A pointer for an electrical measuring instrument comprising a metallic tube provided with a plurality of equally spaced integral webs running parallel with the tube, one end of said tube being flattened and pointed and a small balancing weight adjustably fitting into the other end of said tube.

6. An electrical measuring instrument having a shaft comprising a thin metallic tube provided with four equally spaced integral webs running parallel with the tube and a pointer secured to said shaft comprising a smaller tube provided with three equally spaced integral webs running parallel therewith, said pointer passing through the shaft at right angles thereto and between the webs thereof.

7. A pointer for an electrical measuring instrument comprising a thin metallic tube provided with a plurality of integral webs running parallel with the tube.

In witness whereof, I have hereunto set my hand this 15th day of May, 1924.

BYRON W. ST. CLAIR.